(12) United States Patent
Towers et al.

(10) Patent No.: US 10,974,953 B1
(45) Date of Patent: Apr. 13, 2021

(54) MATERIAL DISPENSERS

(71) Applicant: Amazon Technologies, Inc., Seattle, WA (US)

(72) Inventors: Christopher Robert Towers, Seattle, WA (US); Sridhar Boyapati, Sammamish, WA (US); Dilip Kumar, Seattle, WA (US); Gianna Lise Puerini, Bellevue, WA (US); Jason Michael Famularo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1364 days.

(21) Appl. No.: 14/788,372

(22) Filed: Jun. 30, 2015

(51) Int. Cl.
| G06Q 20/00 | (2012.01) |
| B67D 7/08 | (2010.01) |
| B67D 3/00 | (2006.01) |
| G06Q 20/20 | (2012.01) |

(52) U.S. Cl.
CPC ............. *B67D 7/08* (2013.01); *B67D 3/0051* (2013.01); *G06Q 20/203* (2013.01)

(58) Field of Classification Search
CPC ...... G06Q 30/06; G06Q 30/04; B67D 1/0888; B67D 7/08; B67D 3/00; B67D 2007/044; G01G 19/40; G01G 13/20
USPC .......... 705/22, 305; 700/231, 233, 236, 232; 222/1
See application file for complete search history.

(56) References Cited

U.S. PATENT DOCUMENTS

| 9,117,106 | B2 | 8/2015 | Dedeoglu et al. |
| 9,235,928 | B2 | 1/2016 | Medioni et al. |
| 9,473,747 | B2 | 10/2016 | Kobres et al. |
| 2005/0197738 | A1* | 9/2005 | Morrison ................ G01C 9/00 700/231 |
| 2006/0157142 | A1* | 7/2006 | Hillam ................ B67D 7/3209 141/198 |
| 2007/0260471 | A1* | 11/2007 | Krassinger ............. G06Q 30/04 705/22 |
| 2007/0289783 | A1* | 12/2007 | Tump ..................... G01G 13/20 177/200 |
| 2013/0085599 | A1* | 4/2013 | Nicol ..................... G06Q 30/06 700/233 |
| 2013/0284806 | A1 | 10/2013 | Margalit |
| 2014/0244032 | A1* | 8/2014 | Repp ........................ G07F 9/02 700/233 |

(Continued)

FOREIGN PATENT DOCUMENTS

WO   WO-2015022212 A1 * 2/2015 ............. G07F 9/002

OTHER PUBLICATIONS

"Vehicle Service Fluid Control Systems," Lincoln Industrial Corp. brochure, Form 442977, Mar. 2004, pp. 1-12, USA ( Year: 2004).*

*Primary Examiner* — Shannon S Campbell
*Assistant Examiner* — Freda A Nelson
(74) *Attorney, Agent, or Firm* — Lee & Hayes, P.C.

(57) ABSTRACT

This disclosure describes, in part, embodiments of a material dispenser configured to dispense material while tracking an amount of dispensed material and messaging to a user, in near-real-time, the amount of dispensed materials, a running cost of the dispensed materials, and/or the like. The material dispenser may include one or more weight sensors to track an amount of dispensed material and a display to indicate to a user a running amount of material that has been dispensed and a running cost to the user.

20 Claims, 10 Drawing Sheets

(56) References Cited

U.S. PATENT DOCUMENTS

2015/0144653 A1* 5/2015 Kline ................... B67D 1/0888
  222/1
2015/0278790 A1* 10/2015 Jain ........................ G01G 19/40
  705/22

* cited by examiner

MATERIAL DISPENSERS

BACKGROUND

Food dispensers are ubiquitous in grocery stores for dispensing bulk or unpackaged products such as candy, cereal, coffee, and the like. Often times, a user will dispense the food item into a plastic bag provided by the grocery store and will proceed to measure the weight of the filled bag at the cash register for determining a cost of the item to the user. Therefore, the user typically does not know how much an item will cost until after the user has dispensed the item into the bag and weighed the filled bag.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
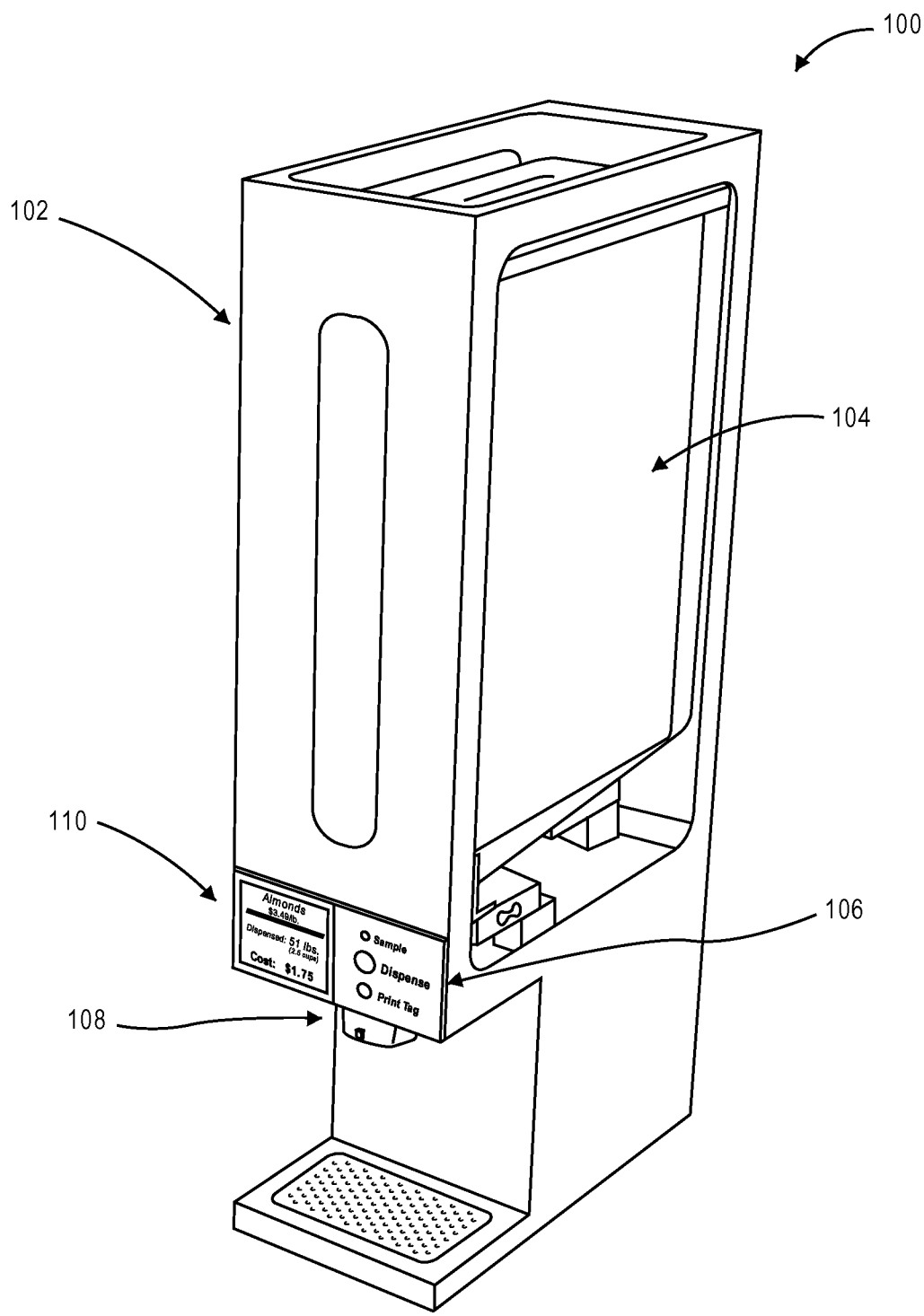
FIG. 1 illustrates an example food dispenser that includes a hopper for containing material, with the hopper residing on weight sensors that measure a weight of the hopper before, while, and after a customer receives material from the dispenser. This change in weight of the hopper may be used to determine how much material has been dispensed as it is being dispensed. Hence, the dispenser may display a running cost to the user as the customer dispenses the material from the dispenser. In addition, the dispenser may include a wired or wireless interface for communicating information such as a final cost for the material to an inventory management system, which in turn may communicate the cost to the user.

This disclosure describes, in part, embodiments of a material dispenser configured to dispense material while tracking an amount of dispensed material and messaging to a user, in real-time or near-real-time, the amount of dispensed material, a running cost of the dispensed material, or the like. In addition, the material dispenser may communicate information to an inventory management system, such as the amount of dispensed material, a total cost of the dispensed material, and the like. The inventory management system may in turn message this information to a user who obtained the dispensed material.

As described below, the material dispenser may include a housing that partially or entirely encapsulates a hopper, which in turn holds the material for dispensing. The hopper may reside atop one or more weight sensors configured to measure a current weight of the hopper. The material dispenser may further include a dispense mechanism configured to control a flow of the material out of the hopper (and potentially into a user container). The weight sensors and the dispense mechanism may also reside partially or entirely within the housing.

The dispense mechanism may comprise any type of mechanism configured to hold the material in the hopper when in a closed state, and allow flow of the material out of the hopper when in an open state. For instance, the dispense mechanism may comprise a screw feeder that rotates when activated to push the material out of the hopper. Additionally or alternatively, the dispense mechanism may comprise a door configured to open to let material out of the hopper and to close to keep material within the hopper. In some or all of these instances, the dispense mechanism may reside at least partly underneath the hopper such that gravity, at least in part, forces the material out of the hopper when the dispense mechanism is in the open state. Additionally or alternatively, the dispense mechanism may push out the material from the hopper, such as in the example of the screw-feeder mechanism. While a few examples have been discussed, it is to be appreciated that the dispense mechanisms may be implemented in any other manner.

Outside the housing, the material dispenser may include a spout to receive material exiting the hopper and the dispense mechanism, with the spout directing the material into a container of a user. The spout may include an attachment mechanism to which a user may attach the user container such that material exiting the hopper and the dispense mechanism is routed into the user container. The attachment mechanism may comprise a tab on which a user container may hang, a clip to clip the user container to the spout, an elastic band that may compress around a top portion of the user container and around the spout to bind the container to the spout, or the like.

In addition, the material dispenser may include one or more controls for controlling operation of the dispenser. The controls may include one or more physical buttons, one or more soft buttons (e.g., on a touch screen display), one or more levers or sliders, and/or the like. In some instances, the controls may include speech-recognition software for receiving and interpreting voice commands from the user.

In one example, the one or more controls of the interface comprise a physical button that, when depressed, causes the dispense mechanism to open to create a flow of the material out of the hopper. When the user releases the physical button, the dispense mechanism may close, thus ceasing the flow of the material. In another example, the dispense mechanism may open upon the user selecting the physical button and may close upon the user selecting the button again. In yet another example, the interface may include a first physical button for opening the dispense mechanism and a second physical button for closing the dispense mechanism.

In other instances, meanwhile, the interface might not include a physical button but may instead communicate with an application executing on a device of a user. For instance, the user device may execute an application that includes a graphical user interface (GUI) that allows a user to issue requests to open and/or close the dispense mechanism via selection of soft buttons on the GUI. For instance, the user device may receive an indication that the user has selected a soft button for opening the dispense mechanism and may communicate this request wirelessly, either directly to the dispenser or to an inventory management system, which in turn sends this request to the dispenser. In some instances, the inventory management system may determine whether or not the request is a valid request and may only instruct the dispenser to dispense the material if it is determined to be a valid request. For instance, if a same user requests two samples within a threshold amount of time, the inventory management system may refrain from instructing the dispenser to dispense the second requested sample.

Regardless of whether the interface includes physical buttons or whether the interface communicates with a user device executing an application, in some instances a user may request that the dispenser dispense a certain amount of material. For instance, rather than the user holding a button to open the dispense mechanism and letting go of the button to close the dispense mechanism, the user may utilize the display, the interface, and/or the application on the user device to request to dispense a certain amount of material (e.g., ½ pound, etc.).

Further, in some instances the dispenser or the application executing on the user device may allow the user to specify an amount of material to dispense. For instance, rather than a user holding down a button to cause the material to flow out of the hopper and releasing the button to cease the flow, the user may specify that the dispenser dispense a certain weight of the material (e.g., one pound, etc.). In another example, the user may instruct the dispenser to dispense a qualitative amount of material, such as "enough for five people", or "enough for one week's worth of snacks". In response to receiving this qualitative input, the dispenser or the inventory management system may calculate the appropriate amount of material to dispense. In still other instances, when the user presses a button to dispense the material, a predefined amount of material is dispensed, regardless of how many additional times the button is pushed within a certain amount of time after the initial button push.

The material dispenser may further include a controller, in the form of software, hardware, and/or firmware, for sending instructions to open and close the dispense mechanism upon a user selecting the control(s) discussed above. For instance, in response to detecting that a user has selected a control to open the dispense mechanism, the controller may issue an instruction to the open the dispense mechanism. Similarly, upon the user releasing the control, or selecting another control, the controller may issue an instruction to close the dispense mechanism and cease the flow of the material out of the hopper.

The interface may include one or more additional controls. For instance, the interface, may include a sample control that, when selected, causes the dispense mechanism to output approximately a predefined sample amount of material. For instance, the interface may include a sample button that, when selected, causes the controller to instruct the dispense mechanism to output the sample amount of material. This sample amount of material may vary between materials and may be configurable by an owner or operator of the material dispenser.

As described further below, the material dispenser may also include a printer to print information regarding a user's interaction with the material dispenser. For instance, the controller of the material dispenser may maintain information regarding the interaction, such as the amount of material dispensed, the cost of the material (e.g., per weight or volume), and a total cost to the user. After the dispense mechanism ceases outputting the material, the user may select the print button. The controller may receive an indication of this selection and may send, to the printer, a request to print a tag that includes one or more of these pieces of information. Additionally or alternatively, the printer may print other information, such as an identity of the material currently in the dispense mechanism.

In some instances, the material dispenser includes a wired and/or wireless interface to communicate this information and the print request to the printer. Upon receiving the instruction, the printer may print a tag for the user. In other instances, the interface of the material dispenser may send a soft copy of this information to another destination, such as an email address or phone number entered by the user. That is, the user may input his or her email address or mobile phone number (e.g., on a touch sensitive display of the dispenser 100) and may request that the material dispenser send this information to that destination. In still other instances, the material dispenser may send this information to an inventory management system, which may in turn communicate this information to the user, as described in further detail below with reference to FIG. 10.

In addition to the printer, the material dispenser may include a display that indicates, to a user, information associated with the user's transaction. For instance, the display may indicate a running cost to the user as the user dispenses material from the hopper. That is, the controller may periodically or continuously determine, from the one or more weight sensors, a weight of the hopper as the dispense mechanism dispenses the material. The controller may use this weight information to determine how much the dispense mechanism has dispensed and may determine a current cost of the dispensed portion of material. In some instances, the controller may itself calculate the cost. In other instances, the inventory management system may make this and other calculations based on information regarding the amount of dispensed material received from the dispenser. In either instance, as the user continues to dispense the material and, therefore, as the weight of the hopper continues to decrease, the calculated cost may continue to rise. The display may show this rising, running cost to the user such that the use knows at each moment the amount that he or she has currently spent.

Further, the display may present additional information, such as the running amount of dispensed material, the cost of the material (e.g., per unit of weight or volume), and/or the like. The display may comprise a liquid crystal display (LCD), a light-emitting diode (LED) display, or any other suitable display technology.

In some instances, multiple adjoined material dispensers may be utilized. That is, a set of material dispensers may couple to one another, such that an operator of a store, for instance, is able to fill each material dispenser with different respective materials. In some instances, the set of dispensers utilize a common printer and/or display. For instance, in one example, each material dispenser may include a display, but each dispenser may utilize a common printer. Therefore, when a user selects the print control from the interface, the respective material dispenser may send a request to print a tag to the interface of the printer, which may print the tag in response.

The dispensers and techniques introduced above may be implemented in a variety of different architectures and contexts. One non-limiting and illustrative implementation of a material dispenser is described below.

FIG. 1 illustrates an example material dispenser 100 that includes a housing 102 and a hopper 104, residing at least partly within the housing 102, for containing material. The material may include any sort of edible or consumable material (e.g., bulk food items such as candy, cereal, sugar, coffee, etc.) or non-edible material (e.g., sand, beebees, grass seed, etc.). The dispenser 100 may also include an interface 106 comprising one or more controls for operating the dispenser 100. As discussed above, these controls may comprise physical and/or soft controls, and may allow a user to dispense material from the hopper 104, cease dispensing the material, obtain a sample amount of the material, print a tag for a transaction, and/or the like.

The dispenser 100 may further include a spout 108 for routing material out of the hopper (and through a dispense mechanism there between) and into a user container, when present. The spout may attach to an outside of the housing such that the weight of a user container coupled to the spout does not bias a weight measurement of the hopper, discussed in further detail below.

FIG. 1 further illustrates that the dispenser 100 may further include a display 110 for providing information to a user operating the dispenser. The display may indicate a type of material currently in the hopper, an amount of material that has been dispensed (as part of an interaction with the user), a cost of the material per unit weight or volume, a cost to the user for the dispensed portion of material, and/or the like. In some instances, a controller of the dispenser 100 updates the display 110 periodically or continuously, such that a user is updated with information in real-time or near-real-time. For instance, as a user requests to dispense material from the dispenser 100, the controller may monitor how much material is leaving the hopper (and, presumably, into a user container) and a cost of the dispensed material. The controller, meanwhile, may provide this information to the display 110, which may display the running amount of dispensed material and/or the running cost to the user. By displaying the running cost, the user is able to dispense material up to a certain cost or weight/volume limit. For instance, a user may cease dispensing material when the user reaches a limit of the user, such as five dollars worth of material, two pounds of material, or the like.

Further, and as described below, in some instances the dispenser 100 and/or the inventory management system may identify the user interacting with the dispenser 100. For instance, the inventory management system may identify the user from image data captured by one or more cameras within an environment of the dispenser and may provide an indication of the identified user to the dispenser 100. In other instances, the user may provide a user identifier to the dispenser 100 for use in identifying the user. For instance, the user may use the display and interface to log into the dispenser 100, may swipe a card having an RFID tag associated with the user, or the like. In each of these instances, the dispenser 100 may output personalized information associated with the user. For instance, the dispenser 100 may present personalized information on the display, such as "Welcome, John", "These almonds are on your grocery list", or the like. While a few examples are provided, it is to be appreciated that this personalized information may include information based on a user's nutritional preferences, a user's purchase history of the item in the dispenser, warnings that are unique to the user (e.g., "this may have peanuts" for a user allergic to peanuts), suggestions to the user regarding how to use the item, information regarding when the item expires, an indication of an amount of material left in the dispenser, information regarding whether or not the user is able to dispense the material (e.g., "your mother has not allowed you to take candy" for a child), information associated with the item (e.g., labeling information, such as calories, ingredients, etc.), and/or the like.

Figure 2:
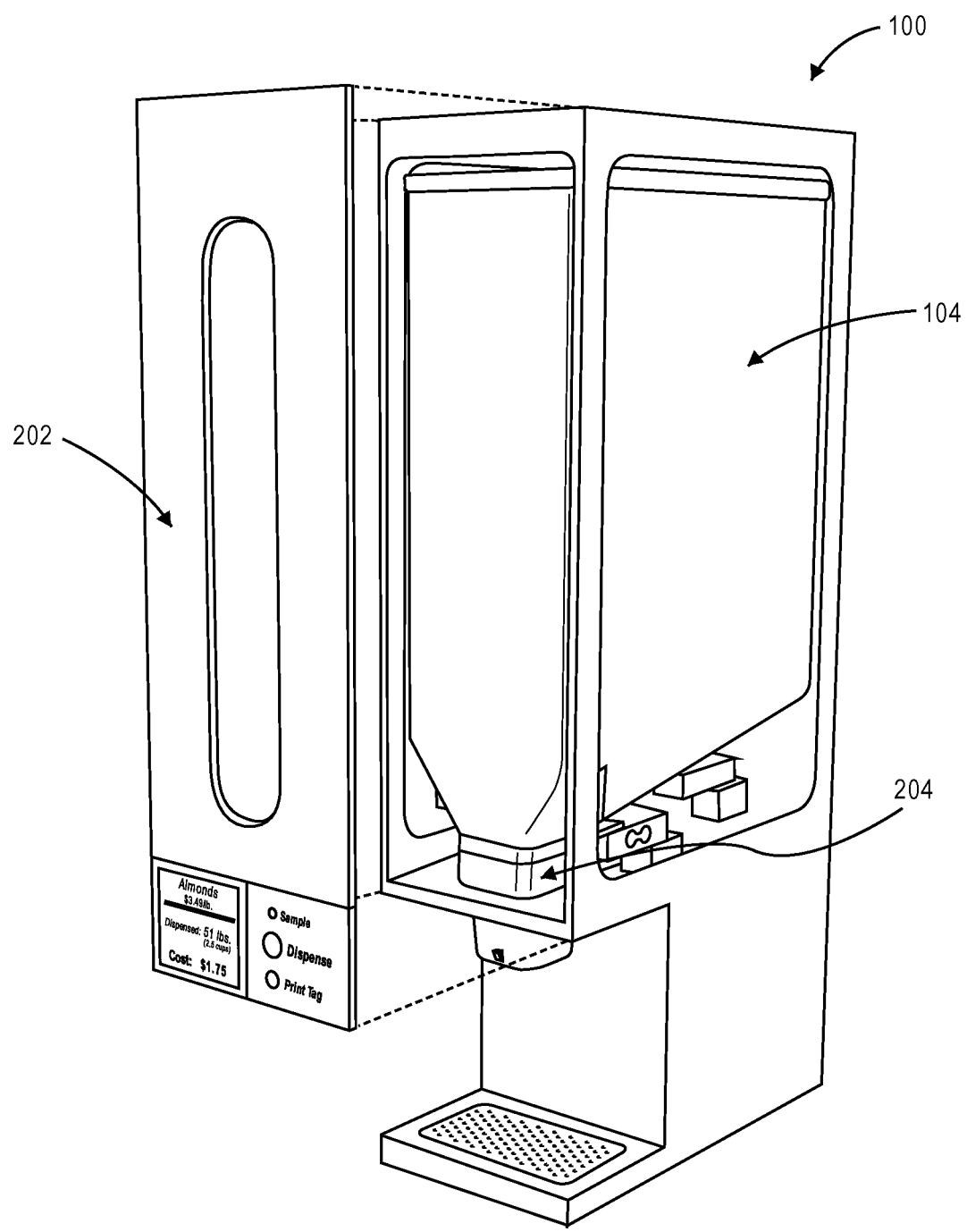
FIG. 2 illustrates an example exploded view of the dispenser of FIG. 1. As illustrated, the hopper resides within a housing upon multiple load cells configured to measure a weight of the hopper. A display and an interface comprising one or more controls, meanwhile, resides on a front panel of the housing.

FIG. 2 illustrates an example exploded view of the dispenser 100 in which a front panel 202 of the housing 102 is shown as separated from a remainder of the housing 102. As illustrated, the display 110 and/or the interface 106 may reside in whole or in part on the front panel 202, although in other implementations they do not. The hopper 104, meanwhile, is shown to reside within the housing 102, as is a dispense mechanism 204. The dispense mechanism 204 may comprise a mechanism that, when opened, results in the material in the hopper exiting the hopper and, presumably, into a user container. When closed, the dispense mechanism may cause the material in the hopper 104 to remain in the hopper 104.

As discussed above, the dispense mechanism 204 may comprise any type of mechanism configured to hold the material in the hopper 104 when in a closed state, and allow flow of the material out of the hopper 104 when in an open state. For instance, the dispense mechanism 204 may comprise a screw feeder that rotates when activated to push the material out of the hopper. The dispense mechanism 204 may additionally or alternatively comprise a door that opens such that material exits the hopper, with the door closing to keep material within the hopper 104. In some or all of these instances, the dispense mechanism 204 may reside at least partly underneath the hopper 104 such that gravity, at least in part, forces the material out of the hopper 104 when the dispense mechanism 204 is in the open state. The dispense mechanism 204 may alternatively push out material from the hopper 104, such as in the example of the screw-feeder mechanism. While a few examples have been discussed, it is to be appreciated that the dispense mechanism may be implemented in any other manner.

Figure 3:
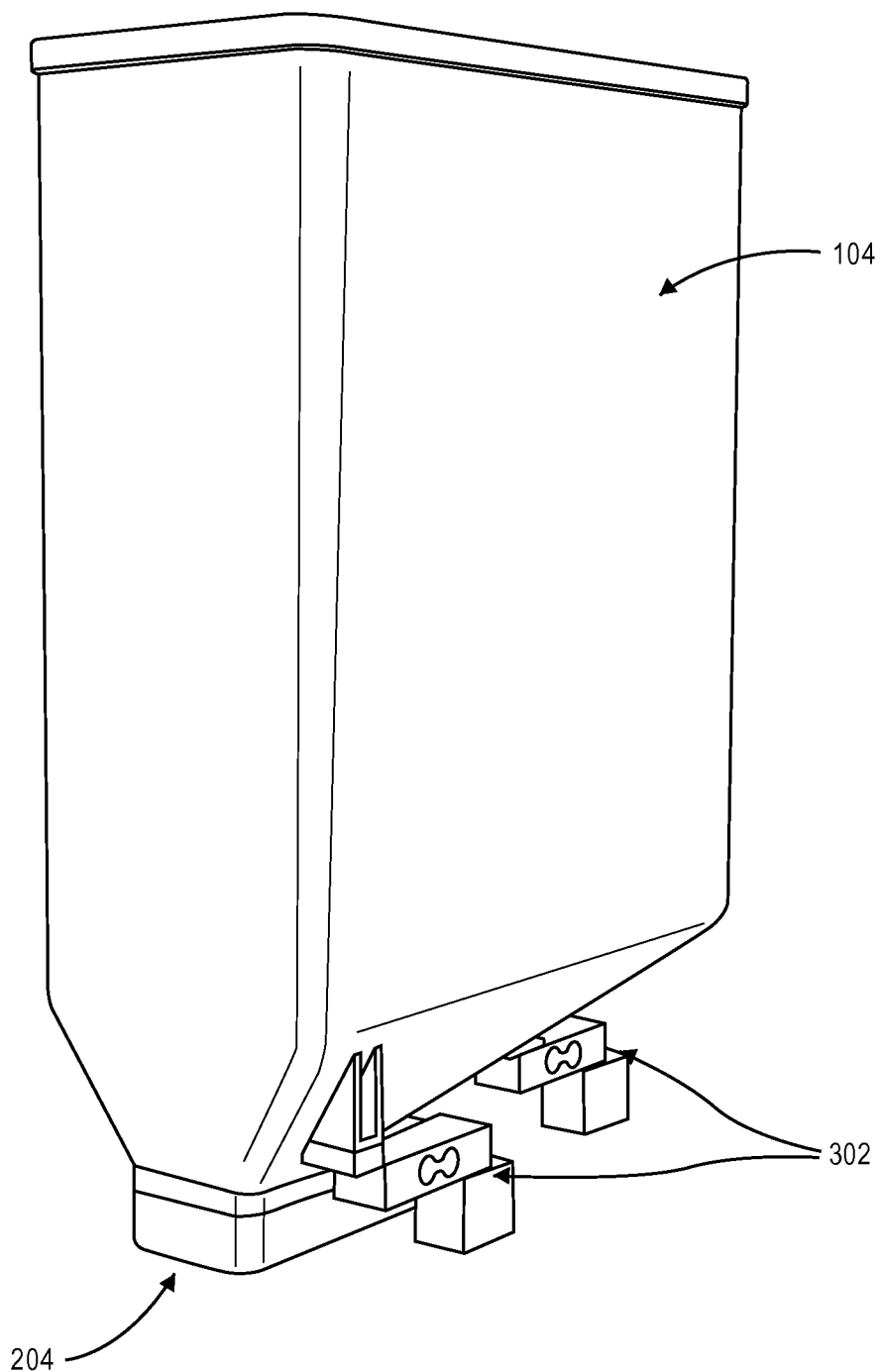
FIG. 3 illustrates an example detailed view of the hopper, a dispense mechanism for dispensing material from the hopper, and the load cells for measuring a weight of the hopper.

FIG. 3 illustrates an example detailed view of the hopper 104, the dispense mechanism 204, and one or more weight sensors 302 for measuring a weight of the hopper 104. As illustrated in FIGS. 2 and 3, the hopper 104 resides within the housing 102 and upon the weight sensors 302. In some instances, the weight sensors 302 comprise load cells (e.g., binocular-beam load cells) that support the hopper 104 at multiple locations. For instance, the dispenser 100 may include at least three load cells, distributed underneath the hopper 104.

The controller of the dispenser 100 may sum the weights measured by the respective weight sensors 302 to determine a total weight of the hopper. Prior to a user utilizing the interface 106 to request to dispense material from the dispenser 100, the controller may read out an initial weight of the hopper 104 as measured by the weight sensors. The controller may then continue to read out the changing weight of the hopper 104 as the dispense mechanism 204 dispenses the material from the hopper 104. This change in weight may be used to determine how much material has been dispensed. The display may then present a running cost and/or weight or volume to the user as the customer dispenses the material from the dispenser 100.

Figure 4:
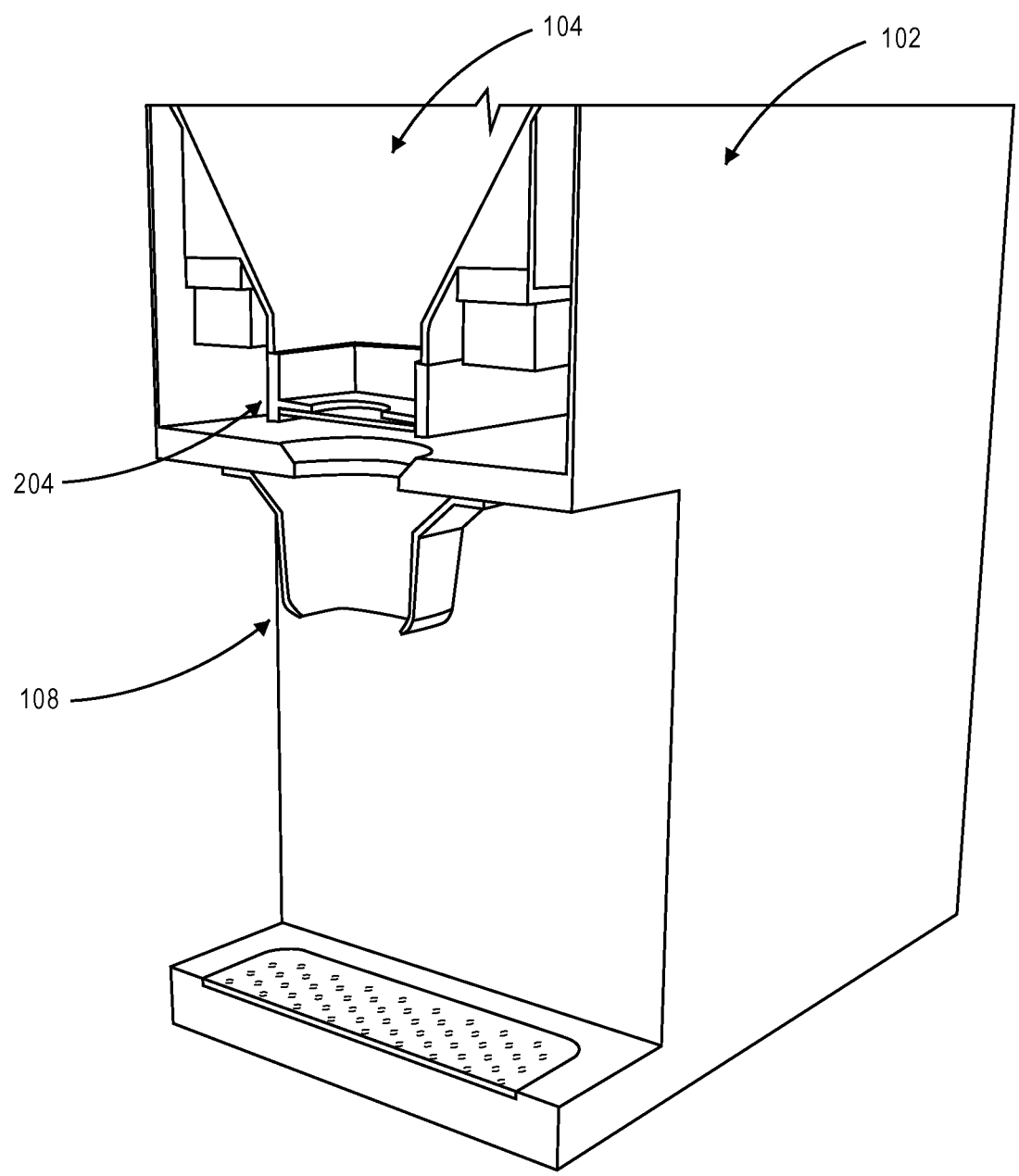
FIG. 4 illustrates an example cross-sectional view of the hopper, the dispense mechanism, and a spout for directing material from the hopper into a user container.

FIG. 4 illustrates an example cross-sectional view of the hopper 104, the dispense mechanism 204, and the spout 108 for directing material from the hopper into a user container. As illustrated, the hopper 104 and the dispense mechanism 204 may reside within the housing 102, while the spout may couple to an outside of, and reside outside of, the housing 102. As discussed in further detail below, a user may couple a user container to the spout 108 to receive the material dispensed from the dispenser 100. By isolating the hopper from the spout, therefore, the changing weight of the user container on the spout does not alter the measured amount of dispensed material and, thus, does not improperly bias the cost of the material to the user.

Figure 5:
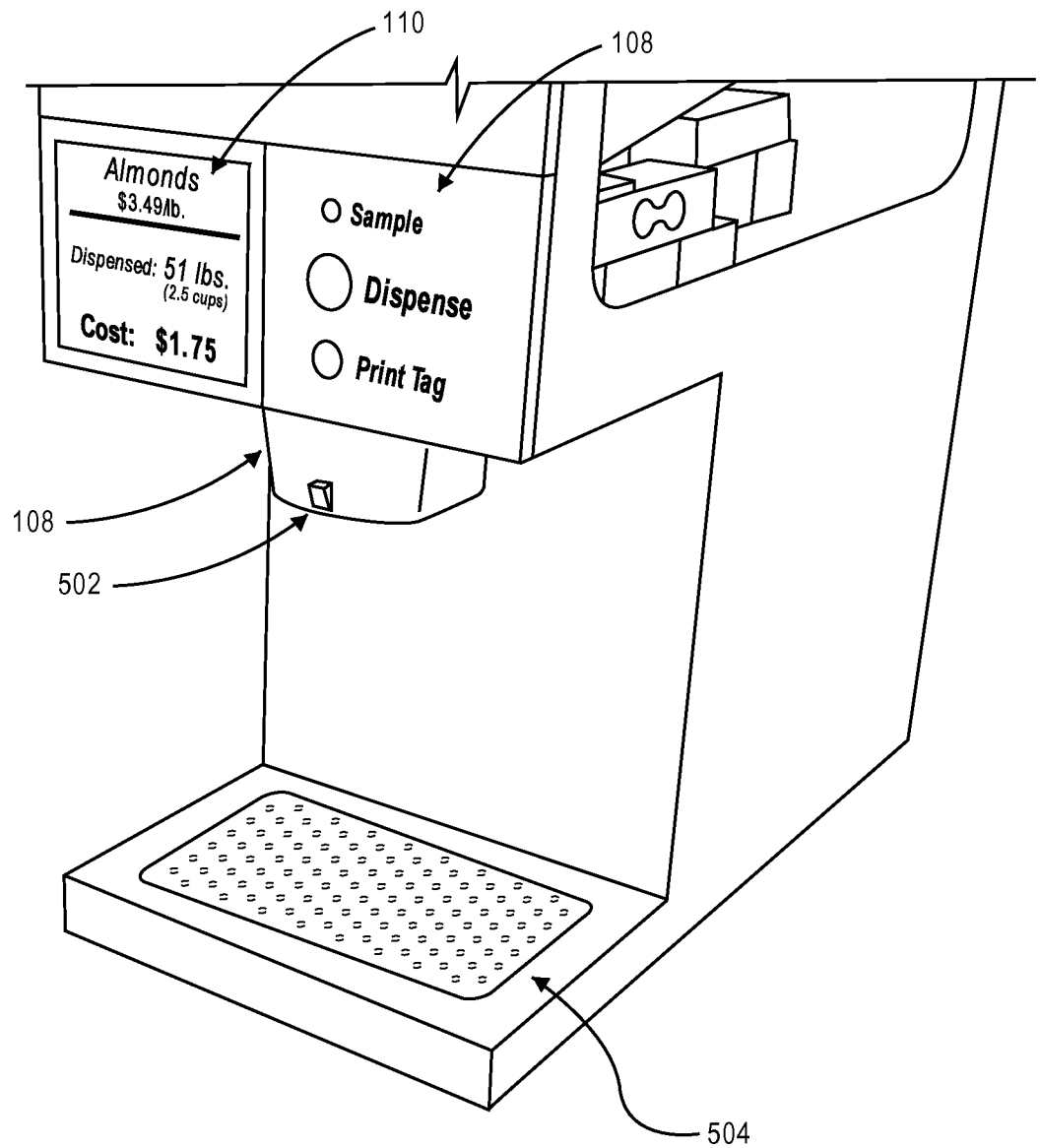
FIG. 5 illustrates an example detailed view of the display for messaging to a user, the interface having the one or more controls to allow the user to operate the dispenser, and the spout. As illustrated, spout includes a tab for holding the user container to receive the dispensed material.

FIG. 5 illustrates an example detailed view of the display 110 for messaging to a user, the interface 106 having the one or more controls to allow the user to operate the dispenser, and the spout 108. As illustrated, spout 108 includes a tab 502 for holding the user container to receive the dispensed material. As described above, the display 110 may present, to a user, real-time details regarding the user's interaction with the dispenser 100. For instance, the display 110 may present the changing amount of the dispensed material as the user continues to request to dispense the material. In addition, the display 110 may present the running cost to the user. As discussed above, the controller may subtract an initial weight of the hopper from a current weight of the hopper to determine how much material has been dispensed. Also as illustrated, the display 110 may present an identity of the material in the hopper 104 and a cost per unit weight or volume of the material, both as set by an owner or operator of the dispenser 100.

In some instances, the controller may be configured to bias a calculated cost of the dispensed material in favor of a user that dispenses the material. For instance, for initial, relatively small amounts of material, the controller may be configured to calculate an initial cost that is less what the cost would be based on the calculated difference between the initial weight of the hopper and the current weight of the hopper. For instance, if a user begins to dispense the material and the weight sensors indicate that one quarter of a pound has been dispensed, the controller may calculate a cost for one fifth of a pound. As the user continues to dispense material, the controller may be configured to slope its calculation towards the actual measured difference. By biasing the cost calculation in favor of the user for amounts of material that are less than a threshold, the dispenser 100 ensures that any errors that may arise in the measured weight or volume of a small amount of dispensed material is resolved in favor of the user.

In some instances, the dispenser 100 may be configured to dispense material in discrete amounts, with these amounts being selected based on a known sensitivity of the weight sensors. For instance, given a certain known sensitivity of a dispenser, the controller may cause the dispenser 100 to dispense the material in 1 ounce increments (or another amount), since the weight sensors are configured to measure this amount of weight change with a tolerable error level. Further, in some instances this discrete amount may change through a dispensing session. For instance, the controller may be configured to cause the dispenser 100 to initially dispense 1 ounce, before thereafter dispensing the material in ½ ounce amounts.

FIG. 5 further illustrates example details of the interface 106. As illustrated, the interface may include a "dispense" button that, when depressed, causes the dispense mechanism 204 to dispense material from the hopper 104. When the user releases the dispense button, the dispense mechanism may transition from the open state to the closed state to cease the flow of the material.

The interface 106 may further include a "sample" button that, when selected, causes the dispense mechanism 204 to output a predefined sample amount of material, without cost to the user. In some instances, the controller may limit the amount of dispensed samples within a certain amount of time. For instance, the sample button may only be effective to provide samples every minute, or the like. Finally, the example interface 106 includes a print button that, when selected, causes a printer of the dispenser 100 to print a tag representative of the user's transaction with the dispenser 100, as discussed in further detail below.

FIG. 5 further illustrates, that the dispenser 100 may include a platform 504, on which a container (e.g., ajar, box, etc.) for receiving material may reside. Because the platform does not sit atop the one or more weight sensors 302, the weight of any container placed on the platform 504 will not bias the measured weight and, hence, the calculated cost to the user.

Figure 6:
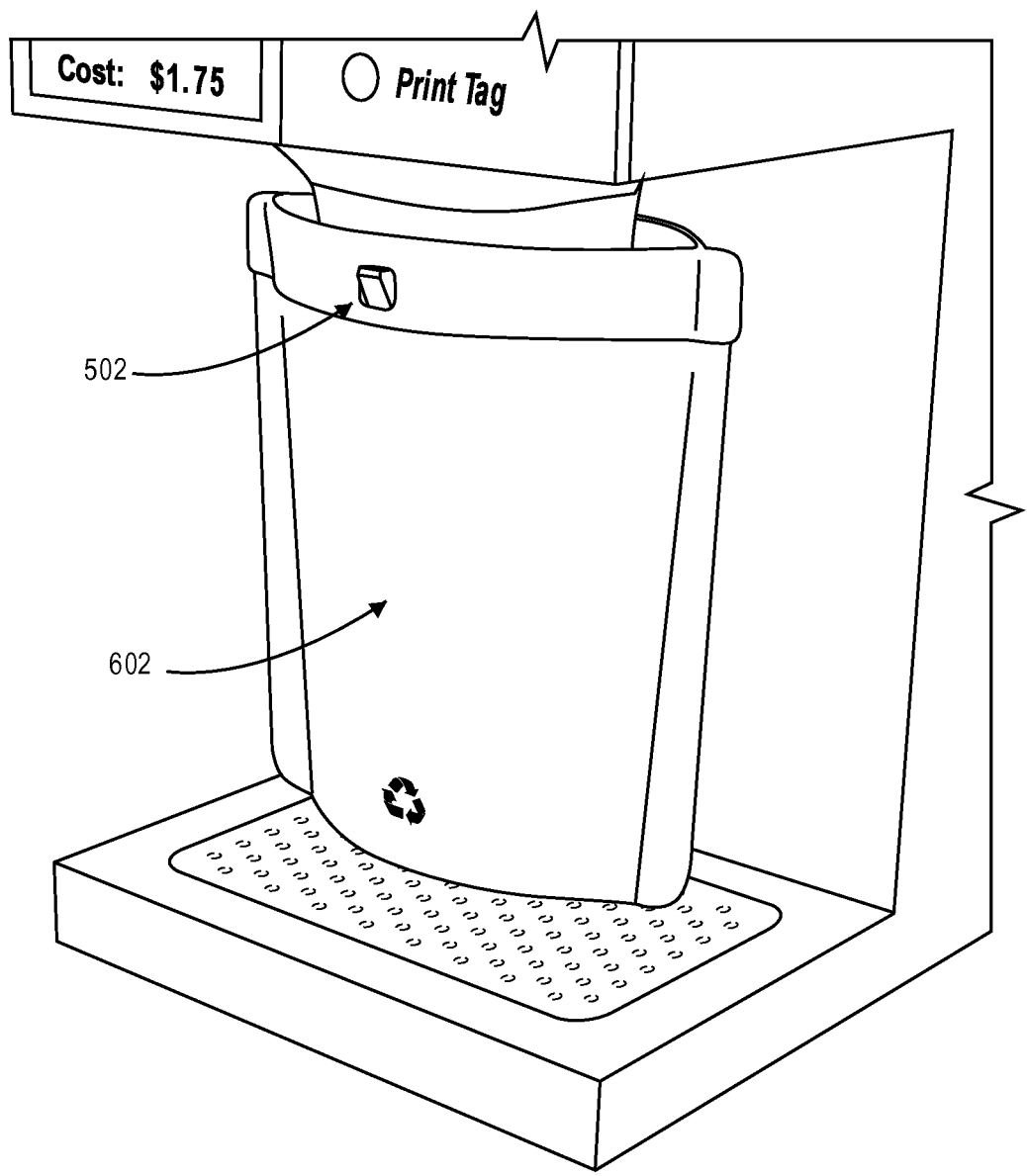
FIG. 6 illustrates another example detailed view of the spout including the tab for holding the user container. This illustration also depicts one example user container.

FIG. 6 illustrates another example detailed view of the spout 108 including the tab 502 for holding a container 602 of a user. The user container 602 may include a hole that fits around the tab 502, such that the user container 602 hangs from the spout 108. As described above, because the spout 108 resides outside the housing (i.e., couples to an outside surface of the housing 102), the weight of the user container 602 and any material therein does not bias the weight measured by the weight sensors—and, hence, the cost to the user presented by the display 110. Further, while FIG. 6 illustrates the tab 502 for securing the user container 602, the spout 108 may include any other type of attachment mechanism.

Figure 7:
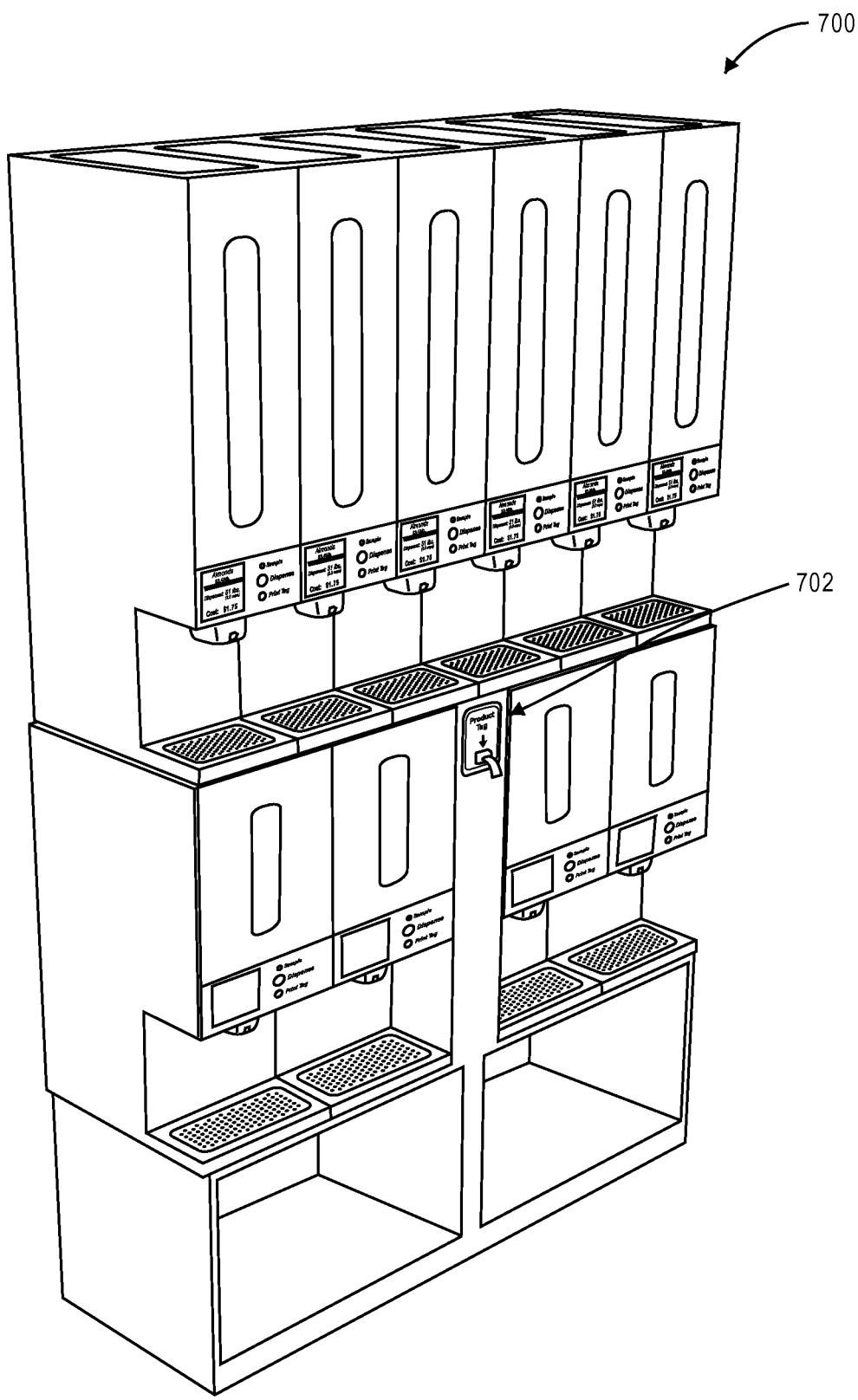
FIG. 7 illustrates an example set of multiple dispensers, with the set including a printer for printing tags indicating how much material a user has dispensed, the identity of the dispensed material, and/or a total cost to the user for the dispensed material.

FIG. 7 illustrates an example set 700 of multiple dispensers, with the set including a printer 702 for printing tags indicating how much material a user has dispensed, the identity of the dispensed material, and/or a total cost to the user for the dispensed material. As illustrated, the set 700 of dispensers may include multiple rows and columns of dispensers, each of which may be filled with the same or different materials. When a user operates one dispenser of the set 700 and requests to print a tag, the respective controller of the dispenser may utilize a wired or wireless interface of the dispenser to instruct the printer to print a tag for the user. The controller may send an indication to the printer of the material that was dispensed, a cost per unit weight or volume of the material, an amount dispensed (e.g., in weight or volume) during the current transaction, a total cost to the user, and/or the like.

Figure 8:
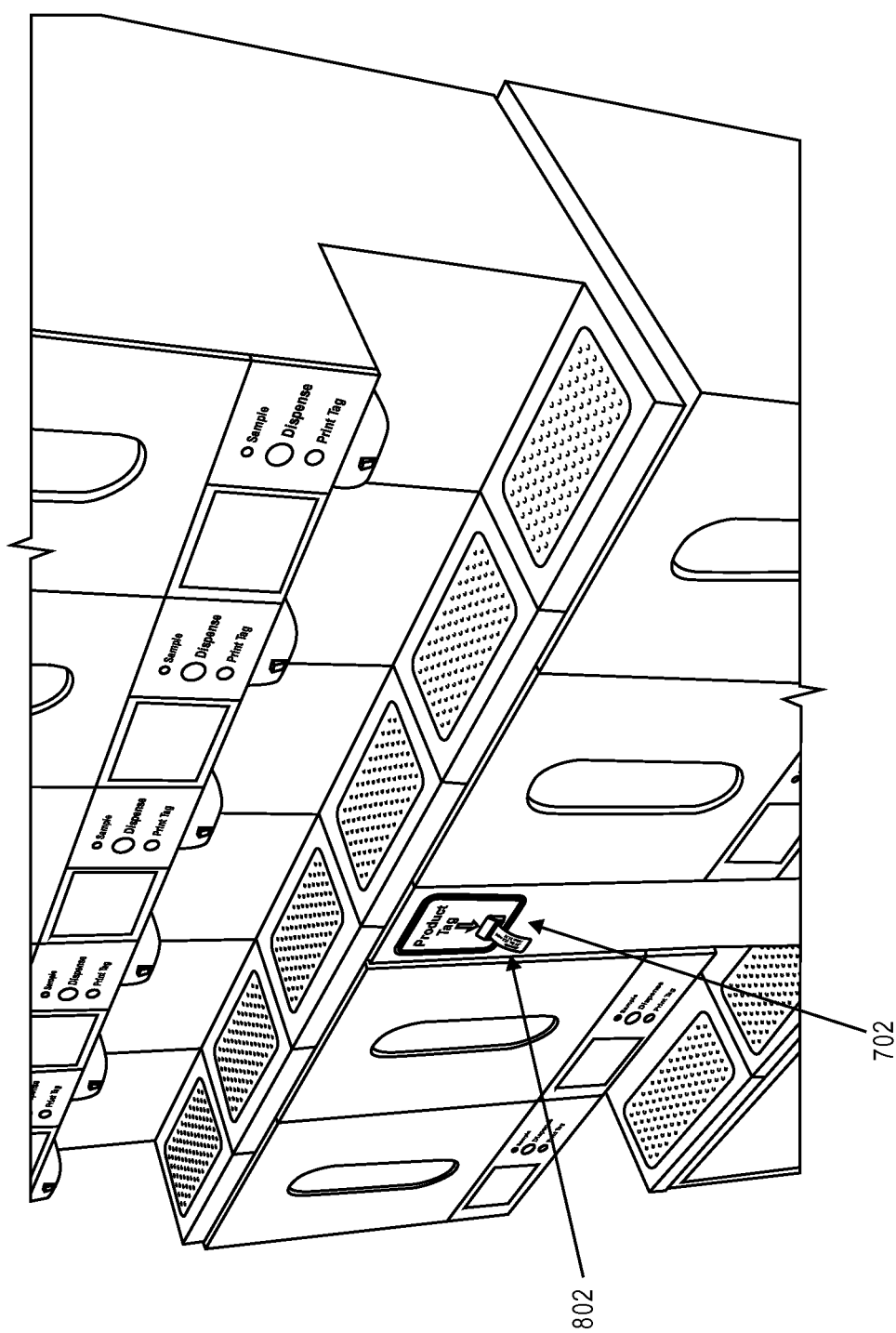
FIG. 8 illustrates the example printer of FIG. 7 in further detail.

FIG. 8 illustrates the example printer 702 in further detail, as well as an example tag 802 that the printer 702 may print. As shown, the printer 702 may reside substantially in a center of the set 700 of dispensers, although in other instances it may reside elsewhere.

Figure 9:
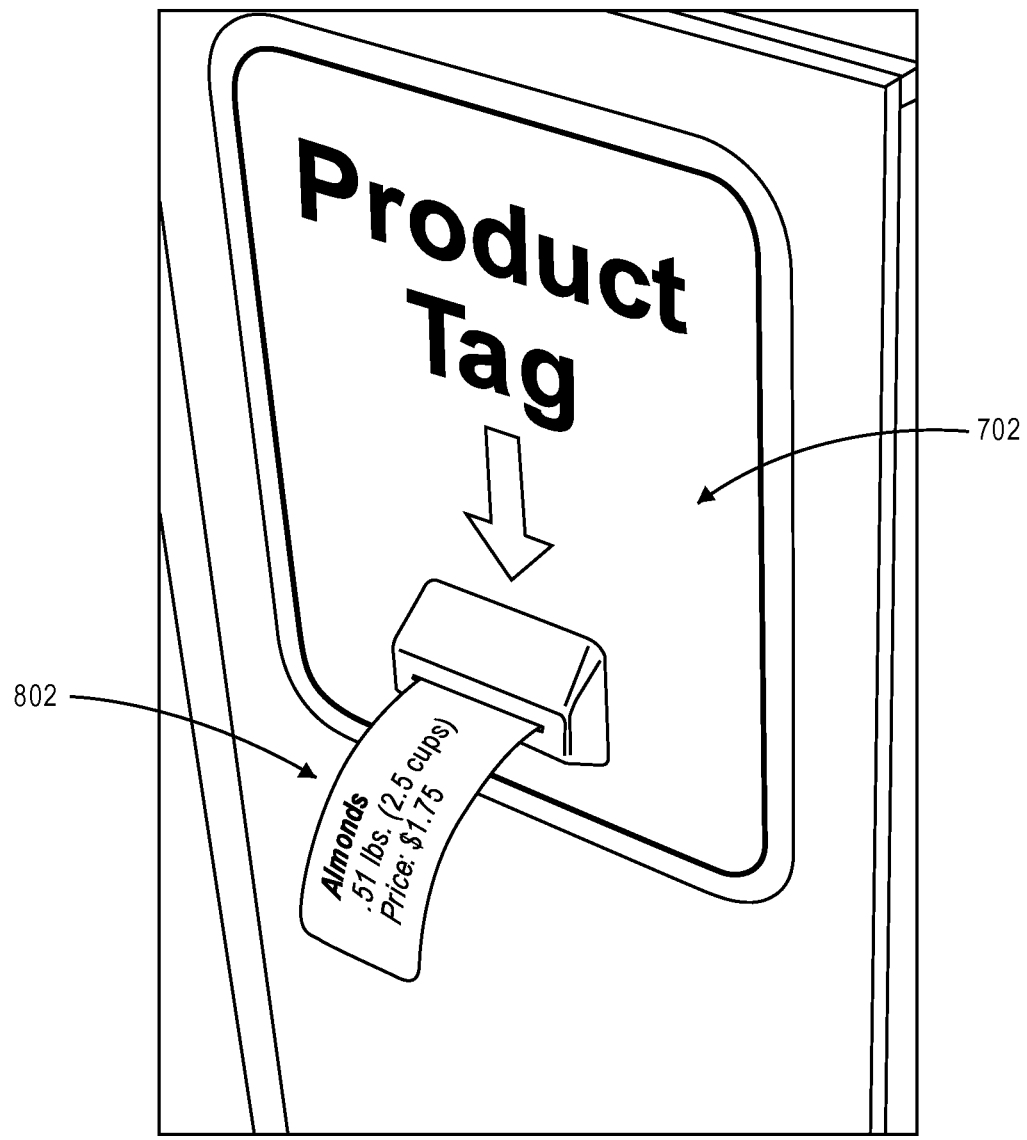
FIG. 9 illustrates example details of a tag that the printer may print for a user. This example tag indicates the identity of the material (almonds), the amount dispensed for the user (0.51 lbs., 2.5 cups), and the total price to the user ($1.75).

FIG. 9 illustrates example details of the tag 802. As show, this example tag 802 indicates the identity of the material (almonds), the amount dispensed for the user (0.51 lbs., 2.5 cups), and the total price to the user ($1.75). Again, other implementations may illustrate more, less, and/or different information on the tags.

Figure 10:
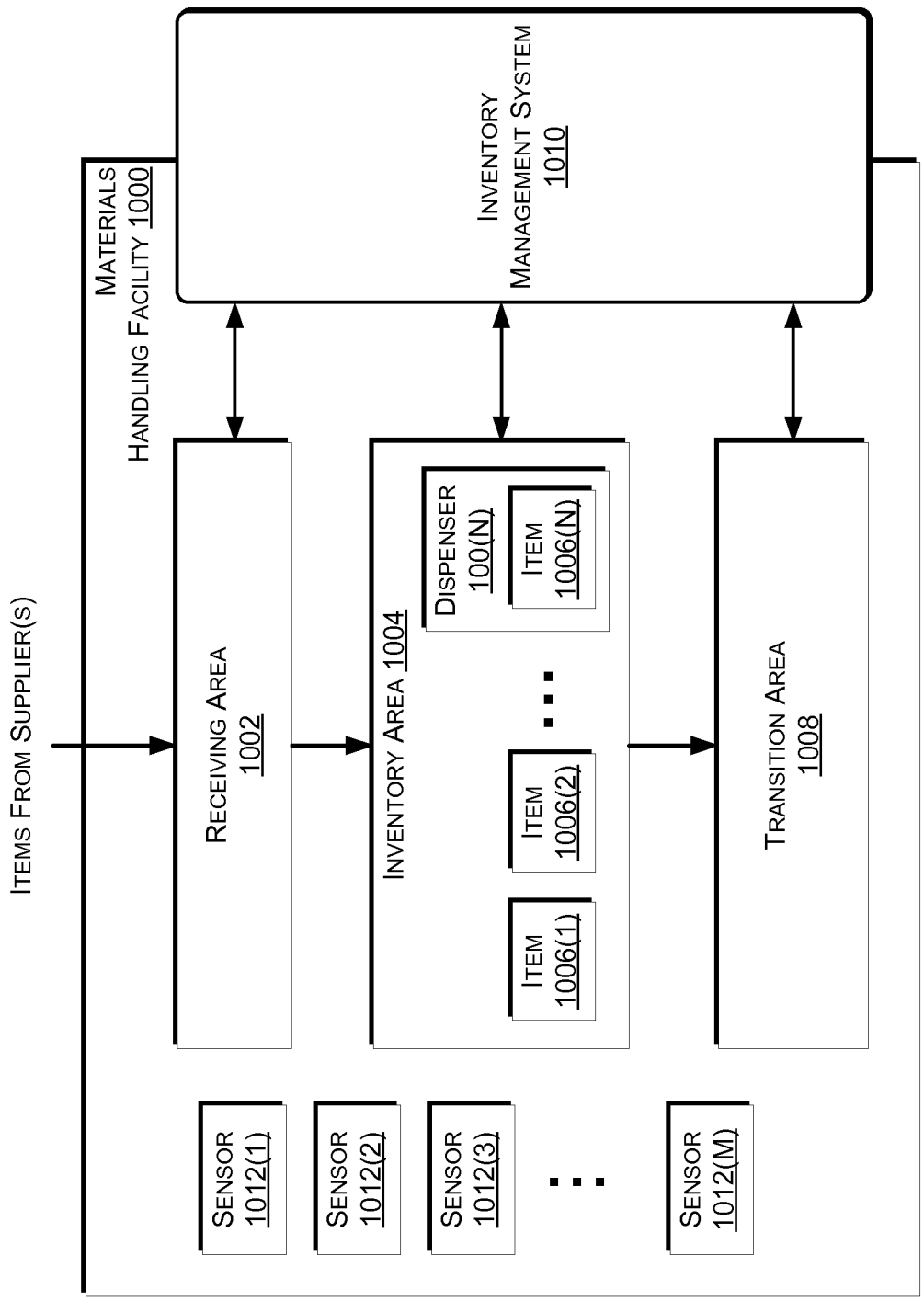
FIG. 10 illustrates an example materials handling facility in which the dispensers described above may reside. As illustrated, the materials handling facility may include an inventory area in which users may obtain items, including items comprising material contained within the example dispensers described herein.

FIG. 10 illustrates an example materials handling facility 1000 in which the dispensers 100 described above may reside. In some instances, these dispensers 100 may communicate information regarding the amount of material obtained by a user, a cost of the material, and the like to an inventory management system. The inventory management system may use this information to store an indication that the identified user obtained the material, charge an account of the user for the amount of obtained material, and the like, as described in further detail below.

As shown, a materials handling facility 1000 includes a receiving area 1002, an inventory area 1004 configured to store an arbitrary number of inventory items 1006(1)-1006 (N), and one or more transition areas 1008. The arrangement of the various areas within materials handling facility 1000 is depicted functionally rather than schematically. For example, in some implementations, multiple different receiving areas 1002, inventory areas 1004 and transition areas 1008 may be interspersed rather than segregated. Additionally, the materials handling facility 1000 includes an inventory management system 1010 configured to interact with each of receiving area 1002, inventory area 1004, transition area 1008 and/or users within the materials handling facility 1000.

The materials handling facility 1000 may be configured to receive different kinds of inventory items 1006 from various suppliers and to store them until a user orders or retrieves one or more of the items. The general flow of items through materials handling facility 1000 is indicated using arrows. Specifically, as illustrated in this example, items 1006 may be received from one or more suppliers, such as manufacturers, distributors, wholesalers, etc., at receiving area 1002. In various implementations, items 1006 may include merchandise, commodities, perishables, or any suitable type of item depending on the nature of the enterprise that operates the materials handling facility 1000.

Upon being received from a supplier at receiving area 1002, items 1006 may be prepared for storage. For example, in some implementations, items 1006 may be unpacked or otherwise rearranged, and the inventory management system 1010 (which may include hardware and/or one or more software applications executing on a computer system) may be updated to reflect the type, quantity, condition, cost, location or any other suitable parameters with respect to newly received items 1006. It is noted that items 1006 may be stocked, managed or dispensed in terms of countable, individual units or multiples of units, such as packages, cartons, crates, pallets or other suitable aggregations. Alternatively, some items 1006, such as bulk products, commodities, etc., may be stored in continuous or arbitrarily divisible amounts that may not be inherently organized into countable units. In some instances, these items may comprise material that is housed in the dispensers 100 discussed above, as FIG. 10 illustrates with item 1006(N) residing within a dispenser 100(N). For instance, if an item comprises cereal or coffee grounds, the material of which this item consists may reside within the example dispenser. Such items 1006 may be managed in terms of measurable quantities such as units of length, area, volume, weight, time duration or other dimensional properties characterized by units of measurement. Generally speaking, a quantity of an item 1006 may refer to either a countable number of individual or aggregate units of an item 1006 or a measurable amount of an item 1006, as appropriate.

After arriving through receiving area 1002, items 1006 may be stored within inventory area 1004 on an inventory shelf. In some implementations, like items 106 may be stored or displayed together in bins, on shelves, in the dispensers 100 described above, or via other suitable storage mechanisms, such that all items 1006 of a given kind are stored in one location. In other implementations, like items 1006 may be stored in different locations. For example, to optimize retrieval of certain items 1006 having high turnover or velocity within a large physical facility, those items 1006 may be stored in several different locations to reduce congestion that might occur at a single point of storage.

When the dispenser 110(N) is initially installed in the materials handling facility 100, the dispenser 110(N) may be configured to communicate with the inventory management system 1010 and may be otherwise made ready for use. For instance, an operator may calibrate the weight sensor after installation of the dispenser 110(N) in order to ensure that the weight and cost calculations made by the dispenser 110(N) or the inventory management system 1010 are accurate. In addition, the operator may test the dispenser 110(N) to ensure that it dispenses the appropriate amounts and/or calculates the amount of dispensed material appropriately. For instance, if the display indicates that it has dispensed one pound of material, the operator may measure the actual amount of material to ensure it is one pound or within a tolerable threshold. In some instances, this tolerance may indicate that it is okay for the dispensed material to weight slightly more than one pound, but not less.

Further, the store an indication, at the dispenser 110(N) and/or at the inventor management system 1010, of the identity of the material stored in and being dispensed by the dispenser 110(N). For instance, the operator may use the display and interface of the dispenser 110(N) to indicate that the dispenser 110(N) is currently holding, for instance, almonds. The dispenser 110(N) and/or the inventory management system 1010 may use this information to determine the proper per weight or per volume cost of the dispensed material. Further, when the dispenser 110(N) is filled with a different material, the operator may provide this information to the dispenser 110(N) and/or the inventory management system 1010. For instance, the operator may use the interface and display of the dispenser 110(N) to indicate that the dispenser 110(N) is now filled with coffee beans. The dispenser 110(N) may then communicate this information to the inventory management system 1010.

In some instances, the dispenser 110(N) may be configured to periodically or otherwise send information regarding its use to the inventory management system 1010. For instance, the dispenser 110(N) may periodically (e.g., once an hour, once a day, etc.) send an indication of how much material remains in the dispenser 110(N). Additionally or alternatively, the dispenser 110(N) may send an indication to the inventory management system when the amount remaining in the dispenser is less than a threshold amount. For instance, when the controller determines from the weight cells that a weight of material in the hopper is less than a weight threshold, the dispenser 110(N) may send an indication to the inventory management system 1010. In response, the inventory management system 1010 may send an indication to a device of an operator of the materials handling facility indicating this information, such that the operator may refill the dispenser 110(N) as appropriate. Further, when the operator refills the dispenser 110(N), the dispenser 110(N) may send an indication that is has been refilled to the inventory management system 1010. This information may include an indication of the item placed in the dispenser, the weight of material placed in the dispenser, and the like. In addition to sending the indication to the inventory management system that the amount remaining in the dispenser is less than the threshold amount, the dispenser may communicate with other dispensers within the facility 100 to determine if any other dispensers have any of the same item remaining. If so, the dispenser 110(N) may communicate this information to the inventory management system 1010 and/or may present a corresponding indication on its display.

In still other instances, the dispenser 110(N) may send information to the inventory management system 1010 when activity at the dispenser appears out of the ordinary, which when reported to an operator of the facility 1010 may potentially raise suspicion of nefarious activity at the dispenser. For instance, if the weight of the hopper lessens significantly without a corresponding dispense session being registered by the dispenser 110(N), the dispenser 110(N) may report this information to the inventory system 1010, which may in turn send this information to an operator of the materials handling facility 1000. Additionally or alternatively, when the dispenser determines that it is out of order, the dispenser 110(N) may message this to the inventory management system 1010 and/or may present a corresponding indication on its display. In response to receiving this indication, the inventory management system 1010 may message this information to one or more operators. Upon the operators fixing the problem at the dispenser 110(N), the dispenser 110(N) may send an indication that it is again operational to the inventory management system 1010, which again may message this information to one or more operators of the facility 100.

While a few examples have been provided, it is to be appreciated that the dispenser 110(N) may send other type of information regarding its status to the inventory management system 1010. For instance, the dispenser 110(N) may send an indication at the end of the day regarding how much material was dispensed or the like. In other instances, the dispenser may periodically send an indication of the status or other information regarding the dispenser 110(N) to the inventory management system 1010, such as whether the dispenser is operational, out of order, full, empty, a current temperature of the dispenser or an ambient temperature around the dispenser, an indication of the expiration date/time of the item, or the like. In still other instances, the dispenser 110(N) may receive queries from the user (e.g., via the display and interface of the dispenser or via an application executing on a user device), and the dispenser may pass these queries onto the inventory management system 1010. The system 1010 may identify answers to these queries and may provide them for output at the dispenser and/or at the application executing on the user device.

When a user order specifying one or more items 1006 is received, or as a user progresses through the materials handling facility 1000, the corresponding items 106 may be selected or "picked" from inventory area 1004. For example, in one implementation, a user may have a list of items to pick and may progress through the materials handling facility picking items 1006 from the inventory area 104. In other implementations, materials handling facility employees (referred to herein as users) may pick items 1006 using written or electronic pick lists derived from orders. In some instances, an item may need to be repositioned from one location within the inventory area 1004 to another location.

For example, in some instances, an item may be picked from its inventory area, moved a distance and placed at another location. In some instances, "picking" an item may include obtaining material from one of the dispensers 100 discussed above.

In some instances, the items 1006, including the items comprising the material that is housed in a dispenser 100, may be tracked using one or more sensors 1012(1), 1012(2), 1012(3), . . . , 1012(M) as they move within, into, and out of the materials handling facility 1000. The sensors 1012 may be arranged at one or more locations within the facility 1000. For example, the sensors 1012 may be mounted on or within a floor, wall, or ceiling, at an inventory location, on a tote for carrying items (e.g., a shopping cart), may be carried or worn by users, and so forth. In addition to tracking the items, the sensors 1012 may be used to identify when users pick items, such as when users obtain material from a dispenser 100. This information may be used by the inventor management system 1010 for charging a user for a cost of the picked item, for example.

The sensors 1012 may include one or more cameras configured to acquire images of the facility 1000. A camera is configured to detect light in one or more wavelengths including, but not limited to, terahertz, infrared, visible, ultraviolet, and so forth. The inventory management system 1010 may use image data acquired by the cameras during operation of the facility 1000. For example, the inventory management system 1010 may identify items, users, totes, and so forth, based at least in part on their appearance within the image data. For instance, the inventory management system 1010 may identify users obtaining material from a dispenser 100. The inventory management system 1010 may identify the user and associate the obtained material with the user, for example to charge a user account for a cost of the material. Charging a user account for the cost of the material may comprise sending a bill for the cost to the user, automatically charging the user for the cost, adding the cost of the item to a receipt of the user that is being updated as the user picks items, or the like.

For instance, the inventory management system 1010 may use the image data from the cameras to identify a user operating the dispenser 110(N). Therefore, when the dispenser 110(N) sends the information regarding the dispense session to the inventory management system 1010 (e.g., an amount of material dispensed, the total cost of the material, the type of material dispensed, etc.) the inventory management system 1010 may associate this information with the account of the user at the inventory management system 1010. For instance, the inventory management system 1010 may store an indication of the item obtained by the user, the amount of the item, the cost of the item, or the like. Additionally or alternatively, the inventory managements system 1010 may charge the account of the user for the cost of the item dispensed by the dispenser 110(N). In still other instances, in response to receiving dispense information from the dispenser 110(N), the inventory management system 1010 may update an inventory, dispatch an associated to refill the dispenser, or the like. Furthermore, while the inventory management system 1010 may identify the user with use of the image data captured by the cameras, the inventory management system may additionally or alternatively identify the user using other sensor data, as described throughout.

The sensors 1012 may also include one or more 3D sensors, which are configured to acquire spatial or three-dimensional data, such as depth information. The 3D sensors may include range cameras, lidar systems, sonar systems, radar systems, structured light systems, stereo vision systems, optical interferometry systems, coded aperture systems, and so forth. The inventory management system 1010 may use the three-dimensional data acquired to identify objects and/or to determine one or more of a location, orientation, or position of an object.

The sensors 1012 may also include one or more buttons configured to accept input from a user within the facility 1000. The buttons may comprise mechanical, capacitive, optical, or other mechanisms. For example, the buttons may comprise mechanical switches configured to accept an applied force from a touch of the user to generate an input signal. The inventory management system 1010 may use data from the buttons to receive information from the user, such as a username and password associated with an account of the user.

The sensors 1012 may also include one or more touch sensors that use resistive, capacitive, surface capacitance, projected capacitance, mutual capacitance, optical, Interpolating Force-Sensitive Resistance (IFSR), or other mechanisms to determine the point of a touch or near-touch. The inventory management system 1010 may use data from the touch sensors to receive information from a user within the facility. For example, a touch sensor may be integrated with a tote of the user (e.g., a shopping cart) to provide a touchscreen with which the user may select from a menu one or more particular items 1006 for picking.

The sensors 1012 may further include one or more microphones configured to acquire audio data indicative of sound present in the environment. In some implementations, arrays of microphones may be used. These arrays may implement beamforming or other techniques to provide for directionality of gain. The inventory management system 1010 may use the one or more microphones to accept voice input from users, determine the location of one or more users in the facility 1000, and so forth.

In still other instances, the sensors 1012 may include one or more weight sensors configured to measure the weight of a load, such as an item, a tote, and so forth. Example weight sensors are discussed above with reference to the dispenser 100. The weight sensors may be configured to measure the weight of the load at one or more of the inventory areas, in a tote, or elsewhere. The weight sensors may include one or more sensing mechanisms to determine weight of a load, such as piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. The inventory management system 1010 may use the data acquired by the weight sensors to identify an object, determine a location of an object, maintain shipping records, and so forth. For example, one of the dispensers 100 may provide an indication of a weight of material taken from the dispenser for use by the inventory management system 1010 in calculating a cost of the material to the user.

The sensors 1012 may further include one or more light sensors configured to provide information associated with ambient lighting conditions, such as a level of illumination. Information acquired by the light sensors may be used by the inventory management system 1010 to adjust a level, intensity, or configuration of the lighting devices in the facility 1000.

The sensors 1012 may also include one more radio frequency identification (RFID) readers, near field communication (NFC) systems, and so forth. The RFID readers may be configured to read the RF tags coupled to items 106. Information acquired by the RFID reader may be used by the inventory management system 1010 to identify an object associated with an RF tag, such as an item, a user, a tote, and so forth. In still other instances, the sensors 1012 may comprise one or more RF receivers. In some implementations, the RF receivers may be part of transceiver assemblies. The RF receivers may be configured to acquire RF signals associated with Wi-Fi™, Bluetooth®, ZigBee®, 3G, 4G, LTE, or other wireless data transmission technologies. The RF receivers may provide information associated with data transmitted via radio frequencies, signal strength of RF signals, and so forth. For example, information from the RF receivers may be used by the inventory management system 1010 to determine a location of an RF source.

The sensors 1012 may include one or more accelerometers, which may be worn or carried by a user, mounted to a tote, and so forth. The accelerometers may provide information such as the direction and magnitude of an imposed acceleration. Data such as rate of acceleration, determination of changes in direction, speed, and so forth, may be determined using the accelerometers. In addition, the sensors may include one or more gyroscopes to provide information indicative of rotation of an object affixed thereto. For example, the tote or other objects or devices may be equipped with a gyroscope to provide data indicative of a change in orientation. The sensors 1012 may also include one or more magnetometers to determine a heading by measuring ambient magnetic fields, such as the terrestrial magnetic field. The magnetometers may be worn or carried by a user, mounted to a tote, and so forth. For example, the magnetometers worn by a user may act as a compass and provide information indicative of which way the user is facing.

The sensors 1012 may also include one or more proximity sensors used to determine presence of an object, such as a user, a tote, and so forth. The proximity sensors may use optical, electrical, ultrasonic, electromagnetic, or other techniques to determine a presence of an object. In some implementations, the proximity sensors may use an optical emitter and an optical detector to determine proximity. For example, an optical emitter may emit light, a portion of which may then be reflected by the object back to the optical detector to provide an indication that the object is proximate to the proximity sensor. In other implementations, the proximity sensors may comprise a capacitive proximity sensor configured to provide an electrical field and determine a change in electrical capacitance due to presence or absence of an object within the electrical field.

The proximity sensors may be configured to provide sensor data indicative of one or more of a presence or absence of an object, a distance to the object, or characteristics of the object. An optical proximity sensor may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a camera. Based on an apparent distance between the features of the structured light pattern, the distance to the object may be calculated. Other techniques may also be used to determine distance to the object. In another example, the color of the reflected light may be used to characterize the object, such as clothing, a tote, and so forth. In some implementations, a proximity sensor may be installed at the inventory area 1004.

While a few sensors have been listed, the sensors 1012 may include other sensors as well, such as ultrasonic rangefinders, thermometers, barometric sensors, hygrometers, or other input devices. Each of these sensors may provide a stream of corresponding sensor data to the inventory management system 1010, as described in detail below.

The facility 1000 may include one or more access points configured to establish one or more wireless networks. The access points may use Wi-Fi™, NFC, Bluetooth®, or other technologies to establish wireless communications between a device and a network coupling the facility to outside computing devices and entities. The wireless networks allow the devices to communicate with one or more of the inventory management system 1010, the sensors 1012, or other devices. In some implementations, a wired networking infrastructure may additionally or alternatively be implemented. For example, cabling may be used to provide Ethernet local area network connectivity between network switches, power injectors and components (e.g., the sensors 1012 and other computing devices).

For example, the example dispenser 110(N) may include a network interface (e.g., a wired or wireless interface) for communicating with the access points and/or directly with the inventory management system 1010. For example, when a user obtains material corresponding to the item 1006(N) from the dispenser 100(N), the dispenser 100(N) may send information regarding this transaction to the access points and/or to the inventory management system 1010. This information may include an amount of material dispensed, a type of the material (e.g., an identity of the item 1006(N), such as almonds), a cost per weight or volume of the item 1006(N), a total cost of the dispensed material, and/or the like.

In some instances, the inventory management system 1010 may aggregate this information received from the dispenser 100(N) with information from one or more of the sensors 1012. For instance, upon receiving the information from the dispenser 100(N), the inventory management system 1010 may analyze data from one or more of the sensors to identify a user that obtained the material. For instance, the system 1010 may use object recognition techniques to identify a user from video data captured by a camera, may use voice recognition to identify a user from an audio signal captured by a microphone, or the like. After identifying the user and receiving the information from the dispenser, the inventory management system 1010 may associate this information with the account of the identified user. For instance, the system 1010 may store an indication that a particular user obtained a certain amount of almonds having a certain cost. The system 1010 may also charge the user for the transaction by, for example, sending a bill to the user, automatically charging a user for the transaction as previously approved by the user, or the like.

The various sensors and computer systems described above may collect a wide variety of data relating to users of systems or facilities employing such sensors or computer systems. The data relating to users may include, for example, images, video, location information, travel patterns, personal identification information, transaction history information, user preferences, and the like. The sensors, systems, and techniques described herein would be typically configured to process this information in a manner that ensures compliance with all appropriate laws, regulations, standards, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An apparatus for dispensing a bulk food item, the apparatus comprising:
   a hopper to contain the bulk food item;
   one or more weight sensors, coupled to a bottom of the hopper, to measure a weight of the hopper;
   a dispense mechanism that includes a door to move between a closed state and an open state to control a flow of the bulk food item out of the hopper;
   an interface comprising one or more controls selectable by a user to: (i) cause the door of the dispense mechanism to change from the closed state to the open state for causing the flow of the bulk food item out of the hopper, and (ii) cause the door of the dispense mechanism to change from the open state to the closed state for ceasing the flow of the bulk food item out of the hopper;
   a controller configured to:
      receive a first indication that the user has selected one of the one or more controls of the interface;
      cause the door of the dispense mechanism to change from the closed state to the open state to cause the flow of the bulk food item out of the hopper;
      identify, from the one or more weight sensors, a first weight of the hopper;
      receive a second indication that the user has selected one of the one or more controls of the interface;
      cause the door of the dispense mechanism to change from the open state to the closed state to cease the flow of the bulk food item out of the hopper;
      identify, from the one or more weight sensors, a second weight of the hopper;
      subtract the first weight from the second weight to determine a first amount of bulk food item removed from the hopper;
      determine that the first amount of bulk food item removed from the hopper is less than a threshold amount;
      determine a difference between the threshold amount and the first amount;
      determine an adjustment value to apply to the first amount to decrease the first amount, the adjustment value decreasing as the difference between the threshold amount and the first amount decreases;
      adjust the first amount by the adjustment value to determine a second amount, the second amount being less than the first amount;
      determine a total cost to the user based at least in part on multiplying a unit cost of the bulk food item by the second amount;
   a display to present the first amount of bulk food item removed from the hopper, the unit cost of the bulk food item, and the total cost to the user; and
   a wireless interface to send, to an inventory management system, an indication of the first amount of the bulk food item removed from the hopper, the unit cost of the bulk food item, and the total cost to the user, the inventory management system to charge the user for the total cost.

2. The apparatus as recited in claim 1, wherein:
the wireless interface is further to receive, from the inventory management system, information that is personalized for the user based on an identity of the user; and
the display is further to present the information.

3. The apparatus as recited in claim 1, wherein:
the one or more controls of the interface are further selectable by the user to issue a request for a sample of the bulk food item;
the controller is further configured to cause the door of the dispense mechanism to change from the closed state to the open state to cause the hopper to output approximately a predefined sample amount of the bulk food item; and
the wireless interface is further to send, to the inventory management system, an indication that the user received a sample of the bulk food item.

4. The apparatus as recited in claim 1, wherein the controller is further configured to:
determine that the first amount of bulk food item is greater than the threshold amount; and
determine the total cost to the user based at least in part on multiplying the unit cost of the bulk food item by the first amount of bulk food item removed from the hopper based at least in part on the first amount of bulk food item removed from the hopper being greater than the threshold amount.

5. The apparatus as recited in claim 1, wherein controller is further configured to:
determine, from the one or more weight sensors, that the second weight of the hopper has changed absent an indication that the user has selected one of the one or more controls of the interface; and
sending, to the inventory management system, an alert indicating that the second weight of the hopper has changed absent the indication that the user has selected one of the one or more controls of the interface.

6. An apparatus comprising:
a hopper to contain a material;
one or more weight sensors, located at least partly underneath the hopper, to measure a weight of the hopper;
a dispense mechanism to control a flow of the material out of the hopper;
an interface to receive, from a user, a request to dispense material from the hopper; and
a controller configured to:
determine, from the one or more weight sensors, an initial weight of the hopper at least partly prior to dispensing material from the dispense mechanism;
determine, from the one or more weight sensors, an end weight of the hopper at least partly after dispensing material from the hopper;
determine that a weight difference between the initial weight of the hopper and the end weight of the hopper is less than a threshold weight difference, the weight difference representing a dispensed amount of material dispensed from the hopper;
determine a difference between the threshold weight difference and the weight difference;
determine an adjustment value to apply to the weight difference to decrease the weight difference, the adjustment value decreasing as the difference between the threshold weight difference and the weight difference decreases;
adjust the dispensed amount using the adjustment value to determine an adjusted amount, the adjusted amount being less than the dispensed amount; and
calculate a total cost based at least in part on the adjusted amount and a unit cost of the material.

7. The apparatus as recited in claim 6, further comprising a display to present the total cost to the user.

8. The apparatus as recited in claim 6, wherein the controller is further configured to determine a running cost over time as a weight of the hopper changes from the initial weight to the end weight, and further comprising a display to present the running cost as the running cost changes over time.

9. The apparatus as recited in claim 6, further comprising one or more controls, and wherein the interface receives the request to open the dispense mechanism and the request to close the dispense mechanism via the one or more controls.

10. The apparatus as recited in claim 6, wherein the interface receives the request to open the dispense mechanism and the request to close the dispense mechanism via an application executing on a device of a user.

11. The apparatus as recited in claim 6, wherein one or more weight sensors comprise multiple load cells located at least partly underneath the hopper, the controller configured to determine the initial weight and the end weight by summing respective measurements from the multiple load cells.

12. The apparatus as recited in claim 6, further comprising a network interface, and wherein the controller is further configured to send, to an inventory management system, at least one of an indication of an amount of material dispensed, an indication of the unit cost of the material, an indication of a type of the material, or an indication of the total cost.

13. The apparatus as recited in claim 6, further comprising a display, and wherein the controller is further configured to cause the display to present an identifier of the material in the hopper, the unit cost of the material, and an amount of material dispensed from the hopper for the user.

14. The apparatus as recited in claim 6, wherein:
the interface includes a control selectable by the user to issue a request for a printed tag indicative of the total cost;
the apparatus further comprises a wireless interface; and
the controller is further configured to send, via the wireless interface, an indication of the total cost to a printer for printing the total cost on a tag.

15. An apparatus for dispensing material, the apparatus comprising:
a housing comprising a front panel;
a hopper to contain the material, the hopper residing at least partly within the housing;
one or more weight sensors to measure a weight of the hopper, the one or more weight sensors residing at least partly within the housing and at least partly beneath the hopper;
a dispense mechanism to selectively dispense the material from the hopper, the dispense mechanism located at least partly within the housing and at least partly beneath the hopper;
an interface to receive a request from a user to dispense material from the hopper;
a controller configured to:
receive an indication of the request, to open the dispense mechanism to dispense an amount of the material, determine that the dispensed amount of the material is less than a threshold, determine a difference between the threshold and the dispensed amount, determine an adjustment value to apply to the dispensed amount to decrease the dispensed amount, the adjustment value decreasing as the difference between the threshold and the dispensed amount decreases, adjust the dispensed amount by the adjustment value to determine an adjusted amount, the adjusted amount being less than the dispensed amount, and calculate a cost to the user for the dispensed amount of the material, wherein the cost to the user is a product of a unit cost of the material and the adjusted amount; and a display to present the cost to the user for the dispensed amount of the material, the display residing at least partly on the front panel of the housing.

16. The apparatus as recited in claim 15, wherein the controller is further configured to:

determine, from the one or more weight sensors, an initial weight of the hopper prior to the request;

determine, from the one or more weight sensors, an end weight of the hopper after the dispense mechanism ceases dispensing the material; and subtract the initial weight from the end weight to determine the dispensed amount of the material.

17. The apparatus as recited in claim 15, wherein the interface includes a sample control selectable by the user to dispense approximately a predefined sample amount of material from the hopper via the dispense mechanism.

18. The apparatus as recited in claim 15, wherein the interface includes a print control selectable by the user to cause a printer to print a tag indicating one or more of the material, an amount of the dispensed amount of the material, or the cost to the user for the dispensed amount of the material.

19. The apparatus as recited in claim 15, wherein the controller is further configured to cause the display to present the cost to the user as the cost increases with dispensing of the material from the hopper.

20. The apparatus as recited in claim 15, wherein the controller is further configured to determine that the dispensed amount of the material is greater than the threshold and calculate the cost to the user by multiplying the unit cost of the material and the dispensed amount of the material, based at least in part on the dispensed amount of the material being greater than the threshold.

* * * * *